United States Patent
Flood et al.

(10) Patent No.: US 12,037,266 B2
(45) Date of Patent: Jul. 16, 2024

(54) REUSABLE COMPOSITE FILTER MATERIAL AND METHODS FOR MAKING AND USING THE SAME FOR REMOVING AND DESTROYING MOLECULAR CONTAMINANTS FROM WATER

(71) Applicants: Cody M. Flood, Oberlin, OH (US); Chad A. Coolidge, Vermilion, OH (US); Jason M. Belitsky, Oberlin, OH (US); Dennis M. Flood, Oberlin, OH (US); Dennis J. Flood, Oberlin, OH (US)

(72) Inventors: Cody M. Flood, Oberlin, OH (US); Chad A. Coolidge, Vermilion, OH (US); Jason M. Belitsky, Oberlin, OH (US); Dennis M. Flood, Oberlin, OH (US); Dennis J. Flood, Oberlin, OH (US)

(73) Assignee: CoreWater Technologies, Inc., Oberlin, OH (US)

( * ) Notice: Subject to any disclaimer, the term of this patent is extended or adjusted under 35 U.S.C. 154(b) by 244 days.

(21) Appl. No.: 17/606,505

(22) PCT Filed: Oct. 10, 2020

(86) PCT No.: PCT/US2020/070651
§ 371 (c)(1),
(2) Date: Oct. 26, 2021

(87) PCT Pub. No.: WO2021/072446
PCT Pub. Date: Apr. 15, 2021

(65) Prior Publication Data
US 2022/0204363 A1 Jun. 30, 2022

Related U.S. Application Data

(60) Provisional application No. 62/914,378, filed on Oct. 11, 2019.

(51) Int. Cl.
*C02F 1/28* (2023.01)
*B01J 20/20* (2006.01)
(Continued)

(52) U.S. Cl.
CPC ............... *C02F 1/288* (2013.01); *B01J 20/20* (2013.01); *B01J 20/26* (2013.01);
(Continued)

(58) Field of Classification Search
None
See application file for complete search history.

(56) References Cited

U.S. PATENT DOCUMENTS 4,820,294 A * 4/1989 Morris .............. A61F 13/51305
604/383
5,973,600 A * 10/1999 Mosher, Jr. .............. G07C 9/28
340/572.1

(Continued)

OTHER PUBLICATIONS

Uribe Madrid SI, Pal U, Kang YS, Kim J, Kwon H, Kim J. Fabrication of Fe3O4@mSiO2 Core-Shell Composite Nanoparticles for Drug Delivery Applications. Nanoscale Res Lett. May 13, 2015;10:217. doi: 10.1186/s11671-015-0920-5. PMID: 26034415; PMCID: PMC4444644. (Year: 2015).*

(Continued)

*Primary Examiner* — Chester T Barry
(74) *Attorney, Agent, or Firm* — Kathryn Perales

(57) ABSTRACT

A specially functionalized composite filter material with a high specific surface area is used to adsorb PFAs from potable water. In a preferred embodiment, the base filter material is granular activated carbon (GAC), which is sequentially coated with a thin layer of polydopamine, a thin layer of partially oxidized iron, and a thin coating of octadecylamine. After PFAs are adsorbed onto the coated GAC particles, the PFAs are removed by a rinsing process, and remain in the rinse effluent. GAC particles are recovered (Continued)

and recoated as needed to restore their adsorptive capacity. The PFA-containing effluent is treated using photochemical processes to destroy the PFA molecules. The now PFA-free effluent can be disposed of as a non-hazardous material. The composite filter material works in systems ranging from small passive systems for personal use to large scale, high-flow-rate utility water treatment systems.

11 Claims, 2 Drawing Sheets

(51) Int. Cl.

| | | |
|---|---|---|
| B01J 20/26 | (2006.01) | |
| B01J 20/28 | (2006.01) | |
| B01J 20/30 | (2006.01) | |
| C02F 1/32 | (2023.01) | |
| C02F 1/72 | (2023.01) | |
| C02F 101/36 | (2006.01) | |

(52) U.S. Cl.
CPC ..... *B01J 20/28016* (2013.01); *B01J 20/2808* (2013.01); *B01J 20/28083* (2013.01); *B01J 20/28085* (2013.01); *B01J 20/3071* (2013.01); *C02F 1/32* (2013.01); *C02F 1/725* (2013.01); *C02F 1/281* (2013.01); *C02F 1/283* (2013.01); *C02F 1/285* (2013.01); *C02F 2101/36* (2013.01); *C02F 2101/40* (2013.01); *C02F 2303/14* (2013.01); *C02F 2305/10* (2013.01)

(56) References Cited

U.S. PATENT DOCUMENTS

| | | | |
|---|---|---|---|
| 7,968,191 B2 | 6/2011 | Hampden-Smith | |
| 9,150,968 B2 | 10/2015 | Adzic | |
| 10,913,668 B2 | 2/2021 | Nickelsen | |
| 2005/0130389 A1* | 6/2005 | Yamazaki | ......... H01L 29/78603 |
| | | | 438/455 |
| 2007/0285252 A1* | 12/2007 | Johnson | ............. G08B 13/2414 |
| | | | 340/572.5 |
| 2011/0139726 A1 | 6/2011 | Jin | |
| 2017/0158609 A1* | 6/2017 | Kim | ...................... C07C 213/02 |

OTHER PUBLICATIONS

Lee, H., Dellatore, S. M., Miller W. M., Messersmith P. B. "Mussel-Inspired Surface Chemistry for Multifunctional Coatings" Science, vol. 318, No. 5849 (Oct. 19, 2007), pp. 426-430. Published by: American Association for the Advancement of Science.

Gu, Z., Fang, J., Deng, B. "Preparation and Evaluation of GAC-Based Iron-Containing Absorbents for Arsenic Removal" Environmental Science & Technology, vol. 39, No. 10 (Apr. 15, 2005), pp. 3833-3843. Published by: American Chemical Society.

Klosterman, L., Bettinger, C. J., "Calcium-Mediated Control of Polydopamine Film Oxidation and Iron Chelation" International Journal of Molecular Science, vol. 18, No. 14 (Dec. 22, 2016), pp. 1-14. Published by: MDPI, doi: 10.3390.

Kim, S., Gim, T., Kang, S.M. "Stability-enhanced polydopamine coatings on solid substrates by iron(III) coordination" Progress in Organic Coatings vol. 77 (May 6, 2014), pp. 1336-1339. Published by: Elsevier.

Ponzio, F., Barthes, J., Bour, J., Michel, M., Bertani, P., Hemmerle, J., D'ischia, M., Ball, V. "Oxidant Control of Polydopamine Surface Chemistry in Acids: A Mechanism-Based Entry to Superhydrophilic-Superoleophobic Coatings" Chemistry of Materials, vol. 28 (Jun. 10, 2016), pp. 4697-4705. Published by: American Chemical Society, doi:10.1021.

Ravichandran, L., Selvam, K., Swaminathan, M., "Photo-Fenton defluoridation of pentafluorobenzoic acid with UV-C light" Journal of Photochemistry and Photobiology A: Chemistry, vol. 188 (Jan. 4, 2007), pp. 392-398. Published by: Elsevier.

Wang, W., Du, Z., Deng, S., Vakili, M., Ren, L., Meng, P., Maimaiti, A., Wang, B., Huang, J., Wang, Y., Yu, G. "Regeneration of PFOS loaded activated carbon by hot water and subsequent aeration enrichment of PFOS from eluent" Carbon, vol. 134 (Apr. 3, 2018), pp. 199-206. Published by: Elsevier.

\* cited by examiner

REUSABLE COMPOSITE FILTER MATERIAL AND METHODS FOR MAKING AND USING THE SAME FOR REMOVING AND DESTROYING MOLECULAR CONTAMINANTS FROM WATER

BACKGROUND OF THE INVENTION

Field of the Invention

This invention relates generally to the treatment of water by sorption using composite sorbents. This invention relates more particularly to removing contaminants containing fluorine or fluorine-containing compounds. This invention also relates to regeneration of sorbents/filters. Specifically, the invention relates to removing molecular contaminants from water along with their safe destruction; in particular removing and destroying molecules of perfluoroalkyls and polyfluoroalkyls, among which are the long chain (C=8) molecules perfluorooctanoic acid (PFOA) and perfluorooctane sulfonate (PFOS) and related short chain PFAs (C≤7) in general.

Description of the Related Art

Evidence is well established that there are now several anthropogenic materials present in the environment that are both persistent and harmful to human (and animal) life. Trace amounts of man-made molecular substances such as perfluoroalkyls and polyfluoroalkyls, collectively abbreviated as PFAs, in potable water are of particular concern. Two examples of ways to remove such molecular contaminants include 1) flowing the contaminated water through a bed of granular particles, the surfaces of which contain active sites for chemical absorption and/or physical adsorption (physisorption); or 2) flowing the contaminated water through a porous membrane, an ultrafine mesh or a network of closely packed fibers made of various materials, all with active surface sites for chemical absorption and/or physisorption. The effectiveness of either approach depends on the number of active sites for capturing and holding the contaminant molecules, and that number in turn depends on the total surface area in contact with the water. An important base filter material characteristic is the ratio of surface area to the mass of the material or specific surface area, denoted SA, usually in units of $m^2/g$.

The higher the specific area of the said composite filter material, the less often the said material will need to be replaced or, if possible, reactivated. There are two ways to achieve high specific areas for granular particles: limit the diameter (or maximum dimension) to a few microns or less if it is a solid particle, or create a large number of nanometer-scale pores (from a few tenths of nanometers to a few hundred nanometers) in the surface of each granular particle. An example of the former is a few micron diameter silica sphere compared to a millimeter or larger diameter silica sphere. (A 1 mm diameter silica sphere, as an example, has a specific area of about 0.1 $m^2/g$ while a 10 micron diameter sphere will have a specific area of about 90 $m^2/g$.) An example of the latter is a porous base filter material.

Those experienced in the art of adsorption of molecular contaminants know it is important to have a distribution of pore sizes in the said porous base filter material. In general, the adsorption is stronger the closer the contaminant molecules can get to the surface of the base filter element. In a small diameter pore, the molecules will automatically be closer to the pore walls, making the adsorption stronger. The smaller, more strongly adsorbing pores are typically said to have higher energy. A non-limiting example of a porous base filter material is granular activated carbon (GAC). Depending on the activation process, GAC can have specific areas as low as a few 10's of $m^2/g$ to above 1500 $m^2/g$. The active surface sites are all essentially on the inner side wall surfaces of the pores in the GAC particle. In general, the pore sizes are typically grouped into three broad classes of sizes: micropores, which measure smaller than two nanometers, typically in this application a few tenths of nanometers to a few nanometers; macropores, which measure larger than 50 nanometers, typically in this application a few nanometers to tens of nanometers; and mesopores, which measure between 2 and 50 nanometers inclusive, typically in this application tens of nanometers to hundreds of nanometers. The higher energy pores are the micropores in a GAC particle. The mesopores are described in the art as pathways for the molecules to reach the smaller pores, and therefore are expected to provide a smaller contribution to the adsorption capacity of the GAC than the micro- and macropores.

Although one common approach for treating potable water containing molecular contaminants such as PFAs is a bed of GAC, a difficulty with this approach is that once the GAC becomes saturated by, for example, PFA molecules, the GAC itself becomes a hazardous material and must be dealt with accordingly. At present there are two broad ways to handle the PFA saturated granular activated carbon materials: 1) disposing of the spent GAC as a hazardous material such that the contaminants cannot escape from it and re-enter the environment; or 2) stripping the contaminant from the GAC and incinerating the contaminant at very high temperatures. Typically such temperatures approach 1000 C. Recent evidence now clearly indicates that extreme precaution must be taken to prevent any release of air born PFA contaminants to the environment during the incineration process. A filtration medium that has been specifically designed to eliminate the need for harsh treatment measures such as 1000 C furnaces is clearly desirable.

BRIEF SUMMARY OF THE INVENTION

The present invention is a reusable, composite filter material and method for making the same that can be made from a variety of base filter materials using simple processes under mild conditions. Suitable base filter materials include solid granular particles, porous granular particles, porous membranes, meshes and solid or porous fibers bundled in networks. In general, a high performing filter material will have a high specific surface area with a large number of active surface sites. An improvement to such a filter material will have the filter material pretreated in such a way that once contaminant adsorption has occurred, a post-adsorption gaseous, solution-based, or combination thereof, treatment process will cause the contaminant to be released from the filter material into the treatment effluent. The treatment effluent may then be directed into a suitable container where it can be further processed to destroy the contaminants, allowing for the safe discharge of the now contaminant-free effluent.

is then coated with polydopamine (PDA) (3) which is functionalized to improve its metal chelating capability. An iron film (4) is placed on the functionalized PDA after which is deposited a film of octadecylamine (ODA) (5). The smaller tunnels are micropores, and the larger openings are mesopores leading to micropores. Drawing is not to scale.

Figure 1:
FIG. 1 depicts a two dimensional cross-sectional representation of a portion of a three dimensional particle (1) of granular activated carbon, showing openings (2) of an ideal array of the pores created by the activation process. The surface of the three dimensional particle (1) with pores (2)
Figure 2:
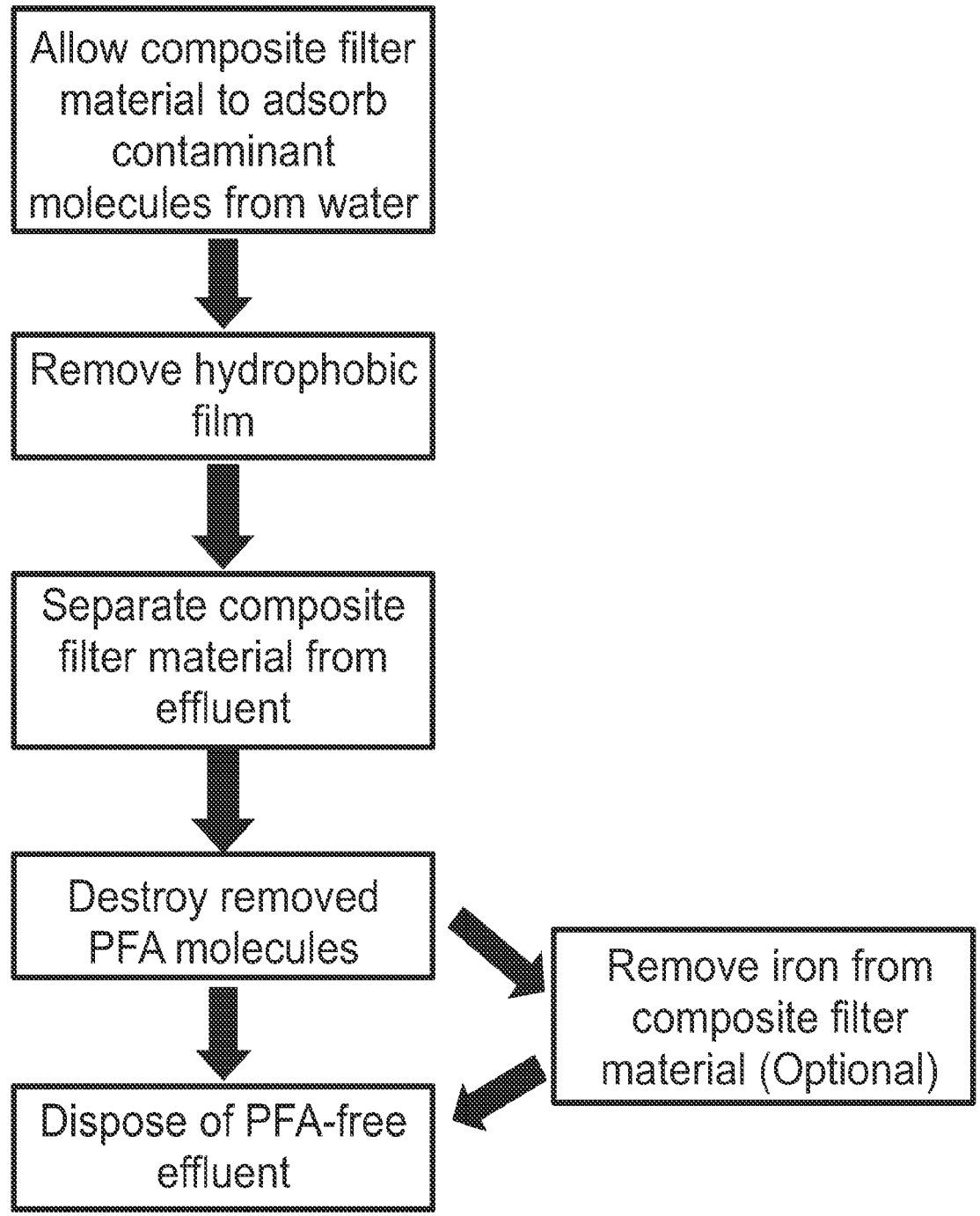

FIG. 2 shows a flowchart of steps required to remove contaminants from water using the composite filter material.

DETAILED DESCRIPTION OF THE INVENTION

All embodiments of the invention will capture a broad range of molecular contaminants from potable water over a wide range of concentrations. As a non-limiting example, the anticipated concentration range for the said PFA molecules extends from a few nanograms per liter to a few micrograms per liter. Again without implying any limitations, the focus of the remaining paragraphs of this section will be on removing PFA molecules from potable water in the cited concentration range. Two prominent examples of the said PFA molecules are perfluorooctanoic acid (PFOA) and perfluorooctane sulfonate (PFOS). Without implying any limitation as to base (i.e. pretreatment) filter material choice or configuration, at least one embodiment of a base filter material is granular activated carbon. Pore widths of the pretreated GAC may range from a few tenths of nanometers (nm) to greater than 100 nm. A first process step deposits a thin coating of an adhesive material on at least a portion of a GAC particle; a second step enhances the chelating ability of the adhesive material; a third step deposits a thin coating of metal that is at least partially oxidized on at least a portion of the functionalized adhesive material; and a fourth step deposits a hydrophobic coating on at least a portion of the oxidized metal coating. All coatings are deposited in simple room (or near room) temperature processes.

Since the present invention includes adding coatings to the pore surfaces that may close up the smaller micropores, it is important at least to have some macropores that at worst end up as micropores after all the coating processes. The coating processes may also cause some mesopores to end up as micropores as well as some macropores that, if small enough, will contribute to the overall adsorption as well.

In one embodiment of the invention, the said functionalized adhesive material coating directly on the GAC surface is comprised of a layer of functionalized polydopamine (PDA). The functionalized PDA layer thickness is in the range from approximately a few tenths of nanometers to approximately 5 nm. The second layer is a thin film of iron deposited on at least a portion of the functionalized PDA layer. The iron film may or may not be continuous over the entire surface of the GAC, and will have a thickness in the range from one monolayer to approximately 5 nm. At least a portion of said iron film is at least partially oxidized. A third layer is comprised of a hydrophobic material that covers in whole or in part the surface of the partially oxidized iron film and potentially a portion of any of the following if present: the non-oxidized iron film, the functionalized PDA coating, the as deposited PDA coating and the uncoated GAC substrate.

Other transition metals, alkali metals, alkaline earth metals, rare earth metals and all remaining other metals from Groups 13, 14 and 15 in the periodic table of elements, and their oxides, if any, may be used in place of, or even along with, iron.

All embodiments of the present invention will physisorb contaminant molecules in water over a wide range of concentrations. Physisorption (i.e. non-chemical adsorption) processes are controlled by hydrophobic, electrostatic or dispersive forces between the contaminant molecules and any given filter material. Adsorption of PFA molecules from water by surfaces with near zero but slightly negative surface charge will occur largely by hydrophobic forces. Similarly, if the surface is near zero but slightly net positive, the adsorption may be a combination of both hydrophobic and weak electrostatic forces. It is generally accepted that hydrophobic forces will dominate the physisorption of hydrophobic molecules onto hydrophobic surfaces.

In one embodiment of the removal process, once the composite GAC particles have become saturated with the PFA adsorbate(s), they may be placed in a solution designed to release the said PFA adsorbate molecules from the composite GAC particles. When released into the treatment solution, the PFA adsorbate molecules may be carried away with the effluent and the adsorbent substrate particles may be kept for reuse. In one embodiment of the present invention, the rinsed substrate particle may be returned to its original, uncoated surface. In another embodiment, the rinsed substrate particle may contain a coating of adhesive catechol-based material on its surface. In yet another embodiment of the invention, the rinsed substrate particle may contain both a coating of the adhesive PDA material and a partially oxidized metal coating on the adhesive PDA coating. In yet another embodiment, the rinsed GAC substrate particle may contain an adhesive material coating, a metal coating, a partially oxidized metal coating and a coating of hydrophobic material. Once rinsed and freed of the hydrophobic coating and contaminant molecules, the GAC substrate particles may be re-processed as needed to restore the material to its pre-adsorption configuration, and reused.

The contaminated effluent from the filtering and rinsing process may be treated using one of several well-known photocatalytic processes. Without limitation but by way of illustration, the rinsing process effluent containing the PFA adsorbate may be mixed with a volume of nanometer-scale photocatalytic particles comprised of one or more metal oxides that will promote photocatalytic destruction of the PFA adsorbate molecules. The catalytic nanoparticles may have a maximum dimension in the range from about 5 nm to 500 nm. The wavelength of the light promoting the photocatalytic destruction of the PFA contaminant may be in the range from about 650 nm to about 100 nm, depending on the electron bandgap of the photocatalytic particle. Once the contaminant destruction is complete, the photocatalytic particles may be recovered by any suitable means (filtration, centrifugation, etc) and the effluent drawn off for disposal.

The method for making the reusable composite filter material that is the subject of this invention is comprised of a series of sequential Procedures, the details of which are provided below. Without limitation as to other substrates, the Procedures described here are applied to GAC particles. Similar Procedures may be used with other composite filter materials, whether granular in nature or in the form of a porous or non-porous membrane, ultrafine mesh, or fiber network such as a bundle of quartz wool fibers. Procedure 1 provides process steps for preparation of commercial granular activated carbon particles for the subsequent Procedures described below. Procedures 2 and 3 provide two alternative sets of process steps to deposit a coating of adhesive material on the GAC. In a preferred embodiment the adhesive material is polydopamine (PDA). Procedure 4 provides process steps for modifying (i.e. functionalizing) the PDA film to create dihydroxyindole (DHI) subunits on its surface to increase its metal chelating capability. Procedure 5 provides process steps for coating the functionalized PDA surface with at least a partially oxidized iron film. Procedure 6 provides process steps for applying a hydrophobic coating of octadecylamine (ODA) to the at least partially oxidized metal coating as a final layer on the GAC particle. The ODA coating is by way of example and not limiting as to other hydrophobic coatings that may be used with other suitable process steps not included here.

All procedures, unless otherwise stated, are carried out at room temperature.

By way of example and not of limitation, once the composite functionalized GAC particles have adsorbed a pre-determined mass of PFA molecules, the adsorbed PFA molecules may be removed from the GAC by removing the hydrophobic layer as described in Procedure 7. If desired, the iron film may subsequently be removed from the particle by following the process steps in Procedure 8. The resulting effluent may be added to the rinse effluent from Procedure 7. The PFA molecules contained in the effluent from the rinsing procedures are then denatured or destroyed by applying the process steps provided in Procedure 9.

The particle adsorption capacity, as well as the total amount of PFA molecules adsorbed under a given set of conditions, may be determined by following the process steps provided in Procedure 10.

The particles, the procedures for making and using the same, and the contaminants described as adsorption targets are illustrative and not limiting. Alternatives to the art described here will be known to persons experienced in the art of depositing materials on surfaces and removing the same.

Procedure 1: Sorting and Cleaning as-Received Coal-Based or Plant-Based Granular Activated Carbon Particles Materials Used:
Granular activated carbon (GAC) particles with a specific surface area greater than 900 $m^2/g$
150 ml-300 ml deionized (DI) water
Nitrogen gas
Process Steps:
Weigh out 10-20 g of as received particles.
By way of illustration and for one particular embodiment, sieve and keep only the 2.36 mm (#8 sieve) to 2.8 mm (#7 sieve) GAC.
Remove dust with pressurized air.
Rinse particles with 150 ml-300 ml DI water.
Dry with a low pressure nitrogen gas stream.
Bake overnight at 125 C.

Procedure 2: Basic-Solution (pH=8.5) Deposition of Thin Coating of Adhesive Catechol-Based Material on Granular Activated Carbon Particles Materials Used:
2 g GAC sorted and cleaned per Procedure 1 above
250 ml 8.5 pH Tris base
0.4 g dopamine hydrochloride
Process Steps:
Combine 2 g particles with 250 ml Tris and 0.4 g dopamine in 1000 ml Erlenmeyer flask.
Aerate and shake at 125 rpm for 2 hours.
Rinse with 100 ml DI water.
Dry sample for 16-24 hours at 70 C.
Reweigh.

Procedure 3: Acid-Based Adhesive Catechol-Based Material Deposition on Granular Activated Carbon Particles Materials Used:
1 g sorted and cleaned GAC per Procedure 1 above
250 ml McIlvaine buffer solution at pH 5
0.4 g dopamine hydrochloride
0.01 g sodium periodate
Process Steps:
Combine 1 g GAC with 250 ml McIlvaine buffer and 0.4 g dopamine in a 1000 ml Erlenmeyer flask.
Add sodium periodate, swirl, aerate and shake at 125 rpm for 2 hours.
Rinse particles with approximately 40 ml DI water.
Stir at 250 rpm in 150 ml DI water for 60 minutes.
Rinse particles with 100 ml DI water.
Dry sample for 16-24 hours at 70 C.
Reweigh.

Procedure 4: Functionalization of the PDA Layer on a GAC Substrate Particle to Create Dihydroxyindole (DHI) Subunits on the PDA Surface Materials Used:
33.29 g $CaCl_2$
6.05 g Tris Buffer
1 L DI $H_2O$
1 g particles with polydopamine coating
HCl
Process Steps:
Prepare $CaCl_2$ and Tris solution by combining 33.29 g $CaCl_2$ and 6.05 g Tris in 1 L DI $H_2O$.
Adjust pH to 9.5.
Combine at ratio: 1 g particles to 100 ml processing solution.
Bubble air through solution for 4 hours and mix with stir bar.
Remove particles from solution and rinse with 200 ml DI $H_2O$.
Incubate particles in pH 2.5 HCl for 15 minutes.
Remove particles from solution and rinse with 200 ml DI $H_2O$.

Procedure 5: Deposition of at Least a Partly Oxidized, Iron Film on the Functionalized PDA Layer on a GAC Substrate Particle—Ferrous Chloride Process Materials Used:
0.01 g $FeCl_2$
5 g PDA@GAC
1 ml NaClO
HCl
NaOH
Shake table
pH meter
Process Steps:
Combine $FeCl_2$ with 25 ml DI water with up to 5 g PDA@GAC per 25 ml in 50 ml flask.
Shake 2 hours at >160 rpm.
After 2 hours, insert pH meter and take reading.
Add 1 ml NaClO.

Once stabilized, adjust pH with NaOH solution (or HCl if necessary) to approximate pH of 5.0.
Resume shaking.
Repeat steps 2-6 three more times (4 ml NaClO used in total).
Rinse twice with 200 ml DI $H_2O$.
Dry for a minimum for 4 hours at 80 C before using finished particles.

Procedure 6: Deposition of a Thin Layer of Octadecylamine (ODA) on the Metal Oxide Layer on the Adhesive Catechol-Based Layer on $Al_2O_3$ or GAC Porous Particle Substrates—Chloroform Process Materials Used:
100 ml chloroform
0.4 g octadecylamine
1.0 g composite particles for coating
Process Steps:
Add 100 ml chloroform to appropriate beaker.
Add 0.4 g octadecylamine to chloroform.
Add 1.0 g composite particles to be coated.
Shake mixture for desired time frame (5 min-2 hours).
Use stainless mesh to filter out particles.
Dry particles, do not exceed 60 C.

Procedure 7: Post Adsorption Removal of Octadecylamine (ODA) Layer Containing PFA Molecules Materials Used:
100 ml DI $H_2O$
Up to 5 g contaminated particles
Hot plate
Process Steps:
Add DI $H_2O$ to beaker and heat to 80 C on hot plate.
Add contaminated particles to beaker and cover.
Heat for up to 1 day.
Strain particles from waste solution.
Test waste solution for PFA content according to EPA Circular 537.1.

Procedure 8: Dissolution of Previously Deposited Iron from Adsorbent Particles Post ODA/PFAs Removal Materials Used:
0.5 g of complete GAC particles retained from Procedure 6
50 ml 5% nitric acid
Process Steps: Important: Perform all Work in Fume Hood.
Place 0.5 g of the previously prepared adsorbent particles in 50 ml of 5% nitric acid preheated to 70 C.
Vibrate on shake table at 125-400 rpm for 15 minutes.
Remove GAC particles from solution by filtering through a Nalgene filter.
Test filtrate for iron concentration.
Rinse particles, save effluent for analysis.
Test waste solution for PFA content according to EPA Circular 537.1.
Test rinse effluent for iron content using any convenient standard technique such as atomic adsorption spectrometer.

Procedure 9: Photocatalytic Destruction of PFOS and PFOA and Related PFA Compounds Using Combined Metal Oxide Nanoparticles Materials Needed:
0.1 g $Fe_2O_3$@$TiO_2$ composite nanoparticles with approximate average maximum dimension in the range from 20 nm to 60 nm
Acid resistant photocatalytic reaction chamber with total volume capacity of 350 ml
Quartz tube jacketed UV-C light source (6 W, 120 v)
300 ml of filtrate and rinse effluent from Procedures 7 and 8
Mini-orbital shake table
Process Steps.
Pour 300 ml of rinse effluent into reaction chamber.
Add 0.1 g composite dry nanoparticles to chamber.
Seal chamber, place on shake table at 200-450 rpm.
Turn on UV light and allow reaction to proceed for at least 24 hours.
Remove solution from reaction chamber.
Allow solution to settle, then decant as much liquid as possible for PFA testing while not pouring out any nanoparticles. If desired, centrifuge solution for maximum nanoparticle retention.

Procedure 10: Photocatalytic Destruction of PFOA and PFOS and Related PFA Compounds Using Single Oxide Nanoparticles Materials Needed:
0.1 g $TiO_2$ nanoparticles with approximate average maximum dimension in the range from 5 nm to 60 nm
Acid resistant photocatalytic reaction chamber with total volume capacity of 350 ml
Quartz tube jacketed UV-C light source (6 W, 120 v)
300 ml of filtrate and rinse effluent from Procedures 7 and 8
Mini-orbital shake table
Process Steps:
Pour 300 ml of filtrate and rinse effluent into reaction chamber.
Add 0.1 g dry nanoparticles to chamber.
Seal chamber, place on shake table at 200-450 rpm.
Turn on UV light and allow reaction to proceed for at least 24 hours.
Remove solution from reaction chamber.
Decant as much liquid as possible for PFA testing while not pouring out any nanoparticles. If desired, centrifuge solution for maximum nanoparticle retention.

The rinsed and separated, now contaminant free adsorbent particles obtained from Procedures 7 and 8 may be re-functionalized by applying the appropriate process or combination of processes described in Procedures 1-6.

Once any of the embodiments of the present invention have been produced, they may be tested for their adsorptive capabilities using Procedure 11 below.

Procedure 11: Testing Composite Filter Material for PFOS and PFOA Adsorption

Materials Needed:
Several grams of prepared composite filter material
Prepared amounts of DI water containing specified concentrations of PFOS and PFOA in the range from approximately 1 ppb each to approximately 100 ppb each Process Steps:
Add composite filter material in amounts ranging from 1 g to 10 g to each of several Erlenmeyer flasks containing at least 100 ml of the prepared contaminated DI water.
Place flasks on an orbital shake table for 24 hours at a speed sufficient to promote mixing of the composite filter material and contaminants.
Decant liquids and analyze following EPA Circular 537.1 test procedures for PFAs.

All of the embodiments of the present invention formed by using the above or similar procedures are suitable for adsorbing contaminant PFA molecules from water. The adsorption may be accomplished 1) by placing the composite filter material in a stationary filter bed and allowing the contaminated water to flow through the bed; or 2) by mixing the composite filter material directly with the contaminated water for a prearranged time, after which the composite filter material is separated from the water by, for example, centrifuging, simple screening or another suitable process.

By way of illustration but not limiting, the test results for the adsorptive capacity of at least one sample of composite GAC particle(s) disclosed in the present invention are as follows: the capacity for adsorbing PFOA: 2.99 mg/g and adsorbing PFOS: 2.43 mg/g. For comparison purposes, test results for raw GAC from the same lot of material after going through procedure 1 are as follows: PFOA: 2.86 mg/g; PFOS: 2.30 mg/g. The results show that the particles embodying the present invention are as effective as the raw particles at adsorbing PFAs. The significant difference is that the PFA molecules adsorbed by the raw GAC particles can only be removed using harsh conditions while the present invention enables said removal by simple processes under mild conditions.

In one embodiment of the present invention, PFA molecules are removed from the composite GAC particles by applying the processes described in Procedure 7 to the composite GAC particles used in a typical adsorption test described earlier. The amount of PFOA adsorbed from 50 ml of contaminated water by 0.5 g of composite GAC articles using Procedure 11 was determined to be 14±1.5 micrograms. The amount of PFOA recovered in 50 ml of initially clean water using Procedure 7 was determined according the EPA Circular 537.1 to be 12±0.8 micrograms, which agrees with the amount initially adsorbed within the noted experimental error.

The invention claimed is:

1. A composite filter material for removing contaminants from water, wherein said composite filter material is made up of a base filter material with a surface area; and
    wherein said base filter material comprises one of a solid granular particle, a porous granular particle, a porous membrane, an ultrafine mesh or a network of solid or porous fibers; and
    wherein a layer of adhesive material at least partially covers said surface area of said base filter material; and
    wherein a layer of metal at least partially covers said layer of adhesive material; and
    wherein said layer of metal is at least partially oxidized; and
    wherein a layer of hydrophobic material at least partially covers said layer of partially oxidized metal.

2. The composite filter material of claim 1, wherein the said base filter material comprises a porous granular particle.

3. The composite filter material of claim 2, wherein the said porous granular particle is microporous.

4. The composite filter material of claim 2, wherein the said porous granular particle is macroporous.

5. The composite filter material of claim 2, wherein the said porous granular particle is mesoporous.

6. The composite filter material of claim 2, wherein the said porous granular particle contains varied amounts of micropores, mesopores and macropores.

7. The composite filter material of claim 1, wherein the said layer of adhesive material comprises polydopamine (PDA).

8. The composite filter material of claim 1, wherein the said layer of metal comprises at least partially oxidized iron.

9. The composite filter material of claim 1, wherein the said layer of metal comprises one of iron, a transition metal, an alkali metal, an alkaline earth metal, a rare earth metal or another metal from Group 13, 14 or 15 of the periodic table of the elements; and
    wherein said layer of metal is at least partially oxidized.

10. The composite filter material of claim 1, wherein the said layer of hydrophobic material comprises octadecylamine (ODA).

11. A method of removing and disposing of contaminants from water, the steps of said method comprising:
    placing a quantity of the composite filter material of claim 1 in contaminated water and
    leaving said composite filter material in the mixture of said contaminated water and said composite filter material for a period of time; and
    removing said composite filter material from said mixture; and
    placing said composite filter material into clean water making a second mixture, heating said second mixture, and keeping said second mixture at an elevated temperature for approximately 1 day; and
    removing said composite filter material from said mixture, leaving an effluent; and
    placing and sealing said effluent from the second mixture in a photocatalytic reaction chamber with a UV light source and either of titanium dioxide nanoparticles or composite nanoparticles made of a titanium dioxide core and a ferric oxide shell; and
    causing said UV light to be turned on and said photocatalytic reaction chamber to be shaken at 250 to 400 RPM for at least 24 hours; and
    placing said recovered composite filter material in an appropriate storage medium for future reprocessing as needed.

* * * * *